(12) United States Patent
Koch et al.

(10) Patent No.: US 7,269,871 B2
(45) Date of Patent: Sep. 18, 2007

(54) SEAL FOR AIRCRAFT BOARDING BRIDGE INCLUDING AN EXTENSION MECHANISM

(75) Inventors: Robert Koch, Bad Sooden Allendorf (DE); Michael Muller, Erlau (DE)

(73) Assignee: Hubner GmbH, Kassel (DE)

( * ) Notice: Subject to any disclaimer, the term of this patent is extended or adjusted under 35 U.S.C. 154(b) by 121 days.

(21) Appl. No.: 11/051,407

(22) Filed: Feb. 4, 2005

(65) Prior Publication Data

US 2006/0174429 A1    Aug. 10, 2006

(30) Foreign Application Priority Data

Apr. 2, 2004    (DE)    ...................... 10 2004 016 272

(51) Int. Cl.
  *E01D 1/00*    (2006.01)
(52) U.S. Cl. ...................................... 14/71.5
(58) Field of Classification Search ................. 14/69.5, 14/71.1, 71.5
  See application file for complete search history.

(56) References Cited

U.S. PATENT DOCUMENTS

| | | | | |
|---|---|---|---|---|
| 3,479,677 A | * | 11/1969 | Burns | 14/71.1 |
| 3,641,604 A | * | 2/1972 | Eggert, Jr. | 14/71.5 |
| 3,693,204 A | * | 9/1972 | Eggert, Jr. | 14/71.5 |
| 3,703,737 A | * | 11/1972 | Eggert, Jr. | 14/71.5 |
| 4,120,067 A | * | 10/1978 | Hone et al. | 14/71.5 |
| 4,333,195 A | * | 6/1982 | Lichti | 14/71.5 |
| 4,817,223 A | * | 4/1989 | Koch | 14/71.1 |
| 5,267,368 A | * | 12/1993 | Saunders | 14/71.5 |

FOREIGN PATENT DOCUMENTS

| | | |
|---|---|---|
| DE | 30 23 885 A1 | 6/1980 |
| DE | 33 06 109 C2 | 2/1983 |
| EP | 0 277 648 A1 | 2/1988 |
| EP | 0 277 648 B1 | 2/1988 |
| EP | 0 802 112 A1 | 3/1997 |
| GB | 1 329 107 | 9/1970 |
| GB | 2 118 502 A | 3/1983 |

* cited by examiner

*Primary Examiner*—Gary S. Hartmann
(74) *Attorney, Agent, or Firm*—Thomas R. Vigil

(57) ABSTRACT

The seal for aircraft boarding bridge, comprises a bellows (5) that spans a gangway bottom plate (10), which comprises a flexible frame (3) at its one open end and having at its other end a gantry frame for fastening to the aircraft to the boarding bridge, the flexible frame (3) resting against the outer skin of the aircraft when the bellows is deployed and an actuation device for actuating the bellows being provided for extending and retracting the bellows. The actuation device comprises a rotatable shaft equipped with a drive. The rotatable shaft (40) permits winding and unwinding of a traction mechanism connected to the flexible frame, the actuation device (20) comprising two articulated arms (30) arranged in a spaced-apart relationship, each articulated arm (30) comprising an upper arm member (31) and a lower arm member (35) coupled to said upper arm member by a hinge, said upper arm member (31) of the articulated arm (30) being hinged to the gantry frame (2) in a roof region of the bellows (5) and the lower arm member (35) being hinged to the flexible frame (3) and an extension mechanism (51, 55) being provided for extending the bellows (5).

20 Claims, 6 Drawing Sheets

SEAL FOR AIRCRAFT BOARDING BRIDGE INCLUDING AN EXTENSION MECHANISM

CROSS-REFERENCE TO RELATED APPLICATIONS

This application claims Priority from German Application No. DE 10 2004 016 272.7-42 filed on Apr. 2, 2004

1. Field of the Invention

The invention relates to a seal for aircraft boarding stairs or for an aircraft boarding bridge, said seal comprising a bellows that spans a gangway bottom plate, said bellows comprising a flexible frame at its one open end and having at its other end a gantry frame intended to be fastened to the aircraft boarding stairs or to the aircraft boarding bridge, the flexible frame resting against the outer skin of the aircraft when the bellows is deployed and an actuation device for actuating the bellows being provided for, said actuation device comprising a rotatable shaft equipped with a drive, said rotatable shaft permitting to wind and unwind a traction means connected to the flexible frame.

2. Description of the Prior Art

Aircraft boarding stairs or boarding bridges are well known; they serve to board the aircraft. Such type aircraft boarding stairs or boarding bridges have an extendible bellows that spans the space between the aircraft boarding stairs or the aircraft boarding bridge and the aircraft in order to protect from weather passengers boarding the plane. The bellows is of a substantially U-configuration type, with the bellows being closed at its bottom by the bottom plate of a gangway. An aircraft boarding bridge comprising an extendible pleated bellows is known from DE 30 23 885 A1. The pleated bellows is hereby carried by what is termed a bellows guidance means adapted to be slidably received by the bridge. On the guidance means there is a pleated bellows cylinder by means of which the frame which is disposed at the front end of the bellows is fit onto the outer skin of the aircraft in the region of the aircraft opening. At its front end, said U-shaped and flexible frame has an elastically deformable bulge, also known as a bumper, for preventing the outer skin of the aircraft from being damaged when the frame is fit thereagainst.

An aircraft boarding bridge tunnel that is adapted to conform at its front end to the various curvatures of aircraft fuselages is also known from EP 0 277 648 A1. By means of a telescopic rod the upper front tunnel end is intended to be pushed toward the fuselage and farther in the longitudinal direction than the lower front tunnel end. The end of the telescopic rod that is turned away from the front tunnel end must be adjustable both in the horizontal and in the vertical direction in order to make it possible to fit the upper front tunnel end against different fuselage contours by varying the incline of the telescopic rod.

A seal for an aircraft boarding bridge with a pleated bellows is known from DE 33 06 109 C2. At its front end, the pleated bellows exhibits a flexible frame configured to match the contour of the bellows. On its front side, the frame has a perimeter bulge for preventing the outer skin of the aircraft from being damaged when fitting the frame thereagainst. A lateral pantograph system is provided to deploy or extend the bellows. Said pantograph system includes a first spring-loaded telescopic spring rod, said first spring-loaded telescopic spring rod comprising a second telescopic spring rod that is connected at its end to the frame of the bellows. Said second telescopic spring rod is articulated to the first telescopic spring rod, a connecting link that is connected to the spring of the first telescopic spring rod being provided between said first and said second telescopic spring rod. The spring of the first telescopic spring rod causes the second telescopic spring rod to extend relative to the first telescopic spring rod, thus making it possible to fit the bumper disposed on the front side of the flexible frame against the hull of the aircraft. A cable guide is provided to allow for extension and also retraction of the bellows. Said cable guide includes a motor adapted to receive the cable. When the bellows is in its retracted state, the spring of the first telescopic spring rod is tensioned. If the motor allows the cable to unwind, the tension of the spring in the first telescopic spring rod causes, through the connecting link, the second telescopic spring rod to pivot or also to extend relative to the first telescopic spring rod so that the frame may fit against the hull of the aircraft. A spring-loaded tension roller is provided for preventing the cable from sagging.

The most recent types of aircrafts have a very contoured outer skin; more specifically at the transition to the nose of the aircraft, the fuselage of the aircraft is in parts extremely angled so that it is not possible to ensure contour-conforming fit of the frame disposed at the front end of the bellows against the hull of the aircraft using conventional aircraft boarding stairs or bridges. Meaning, gaps form through which passengers boarding the aircraft are exposed to weather and through which humidity is moreover allowed to enter the interior of the aircraft when it is raining or snowing.

BRIEF SUMMARY OF THE INVENTION

It is therefore the object of the invention to provide a seal for aircraft boarding stairs or for an aircraft boarding bridge of the type mentioned herein above by means of which the entrance region of even heavily contoured fuselages may be sealed from weather conditions in a simple and low-cost manner.

This object of the invention is attained by providing an actuation device comprising at least two articulated arms arranged in a spaced-apart relationship, each articulated arm comprising an upper arm member and a lower arm member coupled to said upper arm member by a hinge, the upper arm member of the articulated arm being hinged to the gantry frame in the roof region of the bellows and the lower arm member being hinged to the flexible frame, extension means being provided for extending the bellows. The special configuration of the two articulated arms in particular ensures gap-free fit of the more specifically U-shaped frame disposed at the front end of the bellows substantially against the outer skin of an aircraft in the region of the access door even if the fuselage of the aircraft is characterized by a strong bend toward the nose.

Advantageous features and configurations will become apparent from the subordinate claims.

It is more specifically provided that the flexible frame is made from a glass-fiber reinforced plastic material. The prior art teaches to use a spring steel for manufacturing the frame. Although such spring steel is elastically resilient to a certain extent, the elasticity is limited. It has been found out that a frame made from glass-fiber reinforced plastic material far better meets the demands placed on its elasticity.

Advantageously, extension means causing the bellows to extend uniformly along its length are associated with each articulated arm.

In accordance with another advantageous feature of the invention, the extension means itself comprises at least one piston and cylinder unit for extending the articulated arm; said piston and cylinder unit may thereby also be configured to be a gas spring or a spring-loaded telescopic rod. In accordance with another feature of the invention, there is provided a first piston and cylinder unit for extending the lower arm member relative to the upper arm member so as to press the bellows against the outer skin of the aircraft in is the upper region of the frame, meaning in the roof region of the bellows. For this purpose, the first piston and cylinder unit is hinged at its one end to the upper arm member and at its other end to the lower arm member.

A second piston and cylinder unit advantageously serves to pivot the upper arm member outward; said second piston and cylinder unit is hereby hinged at its one end to the gantry frame and at its other end to the upper arm member, thus preventing the frame from sagging under its own weight, meaning that this piston and cylinder unit actually sustains the flexible frame and, as a result thereof, the bellows when said bellows is deployed.

In order to also achieve good sealing in the roof region using the aircraft boarding stairs or boarding bridges of the invention in the case of fuselages having a flat transition from the wall region to the ceiling region, the invention provides, according to a particular feature, for the lower arm member to comprise an end link that is fastened to the lower arm member so as to be inclined at an angle therewith. The angle on the lower side between the lower arm and the end link is substantially less than 180°, that is, for example 130° or 140°, in order to, as already explained, achieve as far as practicable gap-free fit of the flexible frame against the fuselage.

As already explained herein above, the actuation device includes a rotatable shaft having a drive. The rotatable shaft permits to wind and unwind a traction means connected to the flexible frame. In this respect it is provided for, in accordance with the invention, that the rotatable shaft comprises a winding device for the traction means, e.g., a belt, for neatly reeling and unreeling the belt. The winding device should further be configured such that the traction means, meaning a belt for example, will never sag but will be always subjected to a certain tension.

In this respect, in accordance with a particular feature of the invention, it is provided for that the winding device comprises a spring accumulator and a belt pulley connected thereto. The spring accumulator performs the following function. As already explained, the fuselage of the aircraft is strongly bent in the region of its nose as compared to the remaining fuselage. Meaning, the bellows must extend more in the front region of the aircraft than in the rear part thereof. This however also means that the shaft causes more belt webbing to unwind in the front region than in the rear region. Since the shaft receives the belt for both the front and the rear region, one belt being associated with each articulated arm as a result thereof, this would cause the belt to sag in the rear region when the bellows is in its extended condition. The belt is more specifically prevented from sagging by the fact that the spring accumulator comprises, as viewed in the radial direction, an inner and an outer sleeve, said inner sleeve being adapted to be connected to the shaft whereas the outer sleeve is coupled to the belt pulley, said belt pulley being rotatable relative to the shaft. When the bellows is retracted, the spring accumulator is tensioned. When the shaft starts to rotate, causing the belt to unwind from the belt pulley, this is more specifically due to the fact that the housing of the spring accumulator, which is connected with the shaft, is also coupled to the belt pulley. The outer housing portion is more specifically connected to the belt pulley whereas the inner housing portion of the spring accumulator is firmly resting on the shaft. The spring, e.g., a spiral spring, is located between the two housing portions. The one end of the spring is connected to the one sleeve, the other end to the other sleeve.

When the flexible frame of the bellows fits against the outer skin of the aircraft within the range of action of this one first winding device with the shaft still rotating because the frame has no contact with the outer skin of the aircraft in the region of the second winding device, the spring accumulator relaxes as the shaft continues to rotate. It will be obvious therefrom that the belt pulley itself no longer moves so that there is no further belt payout. When the bellows is being retracted, by contrast, the spring accumulator is first tensioned, that is, the spring in the spring accumulator is biased, with the belt pulley being carried along and the belt being wound up again when the bias of the spring of the accumulator has reached its maximum.

As already explained herein above, the U-shaped bellows spans around a gangway bottom plate. A prior art gangway bottom plate includes a floor panel that is displaceably mounted onto a ramp, said floor panel being spring-loaded in the direction of deployment of the bellows. That is, the floor panel retracts against the force of the spring upon abutting the hull of the aircraft so that it is made certain that gap-free fit is provided between the floor panel and the fuselage of the aircraft.

The disadvantage thereof is that this floor panel is quite long; i.e., the maximum length of the retracted bellows is determined by the length of the floor panel. Accordingly, the invention aims at overcoming these shortages.

In this respect, the present invention suggests that the transition bottom plate comprises a plurality of guided floor lamellae or floor members that are joined together. At least one, preferably however two, guide elements in the form of guide rods are provided to guide the floor lamellae, said guide rods connecting the gantry frame to the front floor lamella, the floor lamellae themselves comprising eyes for receiving the guide rods disposed parallel to the longitudinal axis of the bellows on either side thereof. In order to reliably prevent gaps from forming between the various floor lamellae when the gangway bottom plate is being extended and, as a result thereof, the floor lamellae displaced in the longitudinal direction of the bellows, it is advantageously provided for that the floor lamellae comprise, in the region of their longitudinal edges, drivers for extending the floor lamellae in an accordion-like manner to form the gangway bottom plate when the bellows is being extended. It is obvious therefrom that the overlapping lamellae may each comprise a downward or upward oriented bevel for hook-like engagement of the floor lamellae.

In accordance with another feature of the invention, a stabilizer is disposed underneath the floor lamellae in order to prevent the gangway bottom plate from drooping at its ends. The stabilizer advantageously includes two arms that are arranged in a crosswise configuration and are respectively hinged to the front floor lamella on the one side and to the gantry frame on the other side.

In accordance with another advantageous feature of the invention there is provided for that the stabilizer is adapted to be brought into the extended position by a piston and cylinder unit. For this purpose, each arm of the stabilizer is constructed so as to be associated with a piston and cylinder drive in the form of a gas spring or a telescopic spring rod which ensures that the arms adopt an extended position so that the floor lamellae adopt a deployed state as a result thereof. In this context it may however also be envisaged to connect the front floor lamella, being that floor lamella that is in immediate proximity to the outer skin of the aircraft, to the gantry frame through a piston and cylinder unit. In this case, only the lateral guide elements would have to be configured to be more stable in order to prevent sagging or caving.

In accordance with another advantageous feature it is provided for that the front floor lamella is configured to be elastically deformable along its length so as to be capable of conforming to the contour of the fuselage of the aircraft. In order to prevent the fuselage from being damaged by the front floor lamella or by the floor member, the floor lamella also has on its front side, quite like the flexible frame, an elastically resilient buffer, made for example from foam rubber.

Another advantageous feature of the invention is the way the bulge, which is also called a bumper, is connected to the flexible frame and to the front side of the front floor lamella. In accordance with prior art, the bumper has been fastened hereto before to the flexible frame using screws or rivets. Replacing the bumper in particular has been involving considerable expense. In this connection it is the object of the present invention to provide means that permit to readily replace the bumper while ensuring that the bumper be reliably received by the flexible frame or the front floor lamella. Such a stable but still releasable connection of the buffer or bumper to the flexible frame or to the front floor lamella is made possible using a hook and loop tape.

BRIEF DESCRIPTION OF THE SEVERAL VIEWS OF THE DRAWING

The invention is explained in closer detail herein after with reference to the drawings.

DETAILED DESCRIPTION OF THE INVENTION

Figure 1:
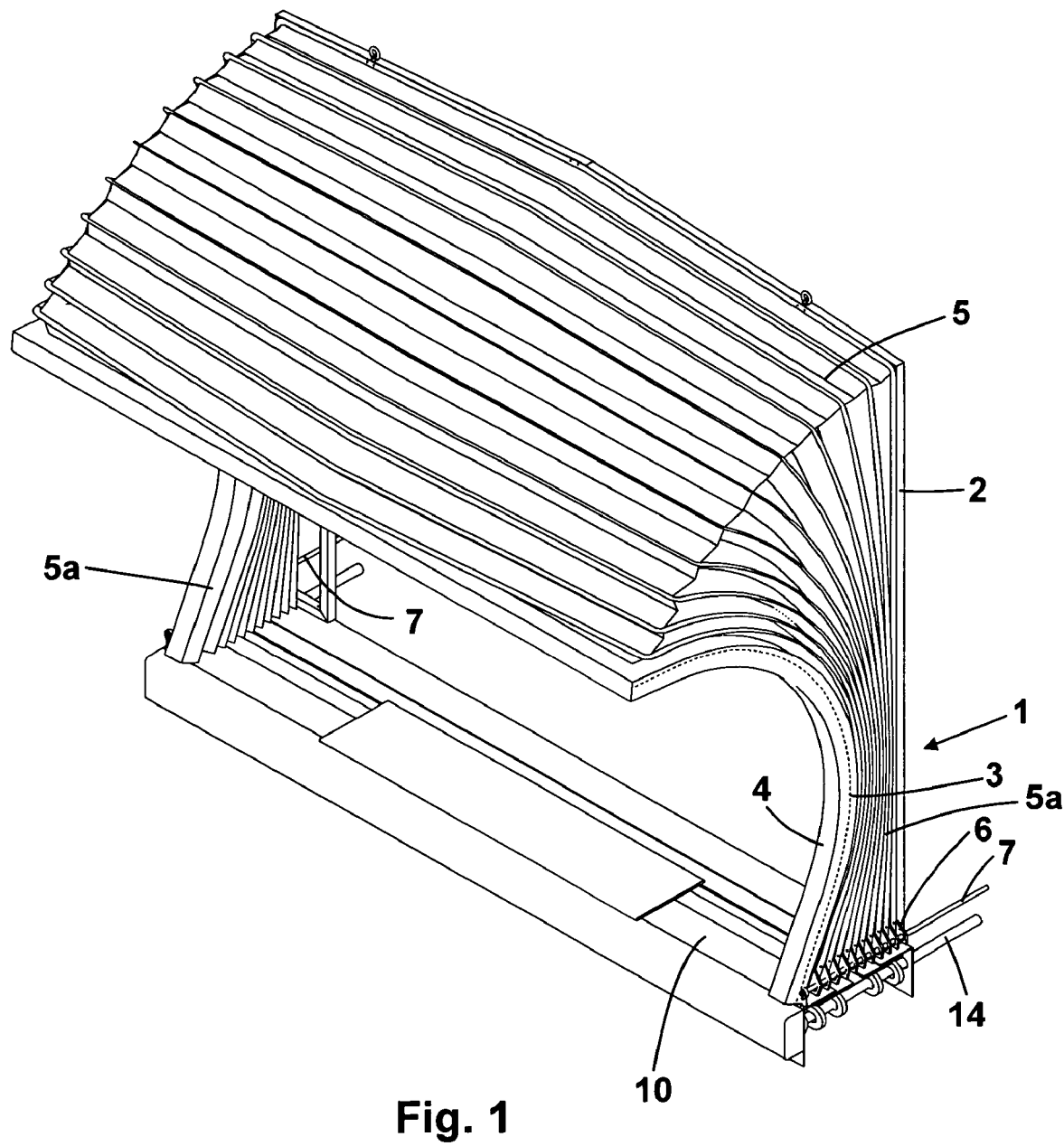
FIG. 1 is a perspective view of the seal for the aircraft boarding stairs or boarding bridge.
Figure 2:
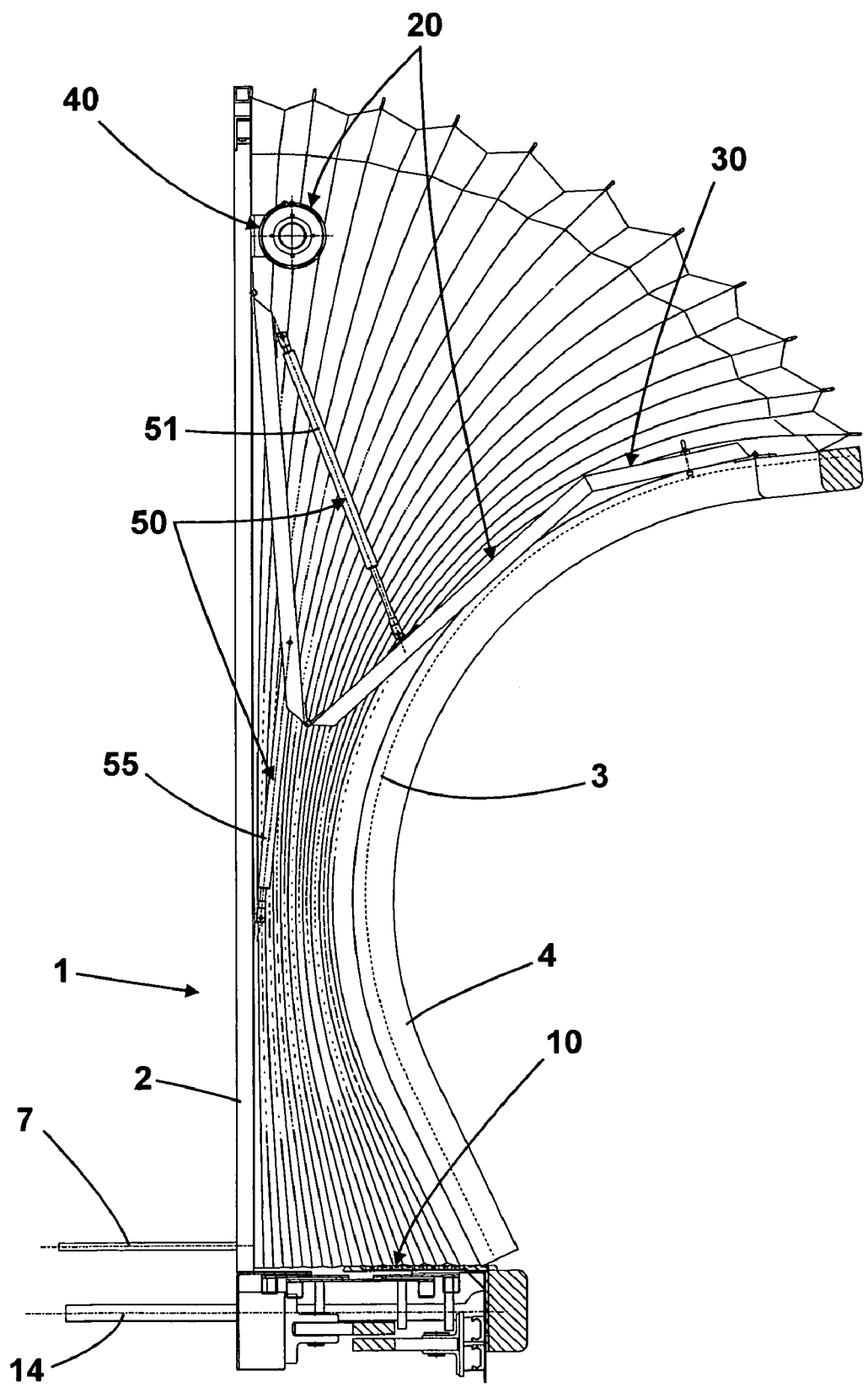
FIG. 2 is a side view.

In accordance with FIG. 1 and FIG. 2, the seal 1 for the aircraft boarding stairs or aircraft boarding bridge includes the gantry frame 2 and the flexible frame 3 that receives at its end the bumper 4 made from an elastically resilient material such as foam rubber. The pleated bellows 5 is mounted between the gantry frame on the one side and the flexible frame 3 on the other side. Like the flexible frame 3 and the gantry frame 2, the pleated bellows 5 is also of the U-configuration type and spans the gangway bottom plate which is indicated generally at 10. In the bottom plate region of the two legs 5*a* of the bellows 5, the bellows has a plurality of bellows eyes 6 that are arranged one behind the other and receive the guide rail 7, said guide rail 7 being on the one side fastened to the flexible frame 3 and on the other side to the aircraft boarding stairs or boarding bridge itself or to the gantry frame 2. The illustration in FIG. 2 shows on the one side the actuation device 20 including the two spaced-apart articulated arms 30 and the rotatable shaft 40 as well as the extension means 50 including the two piston and cylinder units 51 and 55, such an extension means 50 being associated with each hinge arm.

Figure 3:
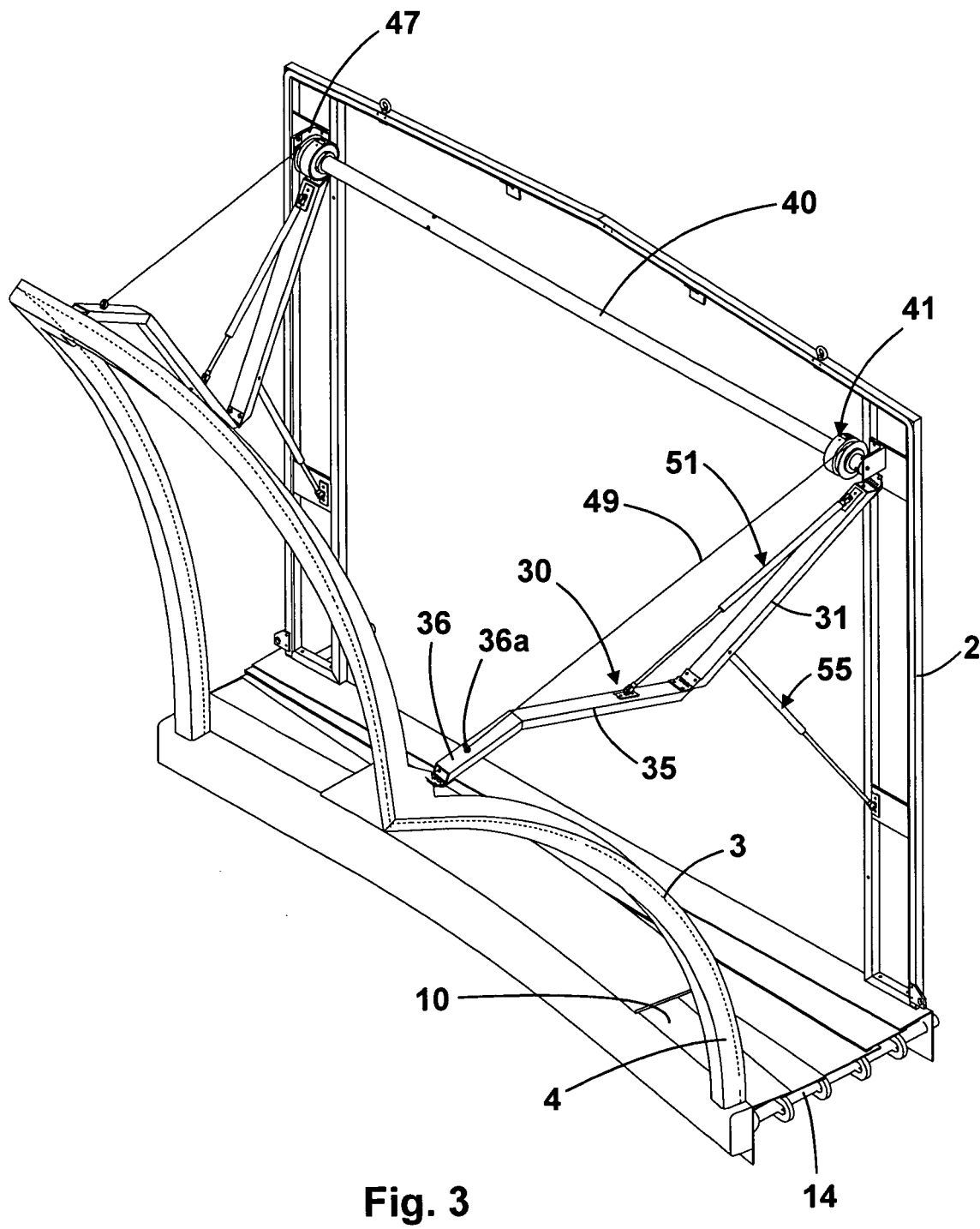
FIG. 3 is a view according to FIG. 1, with the pleated bellows being removed.
Figure 4:
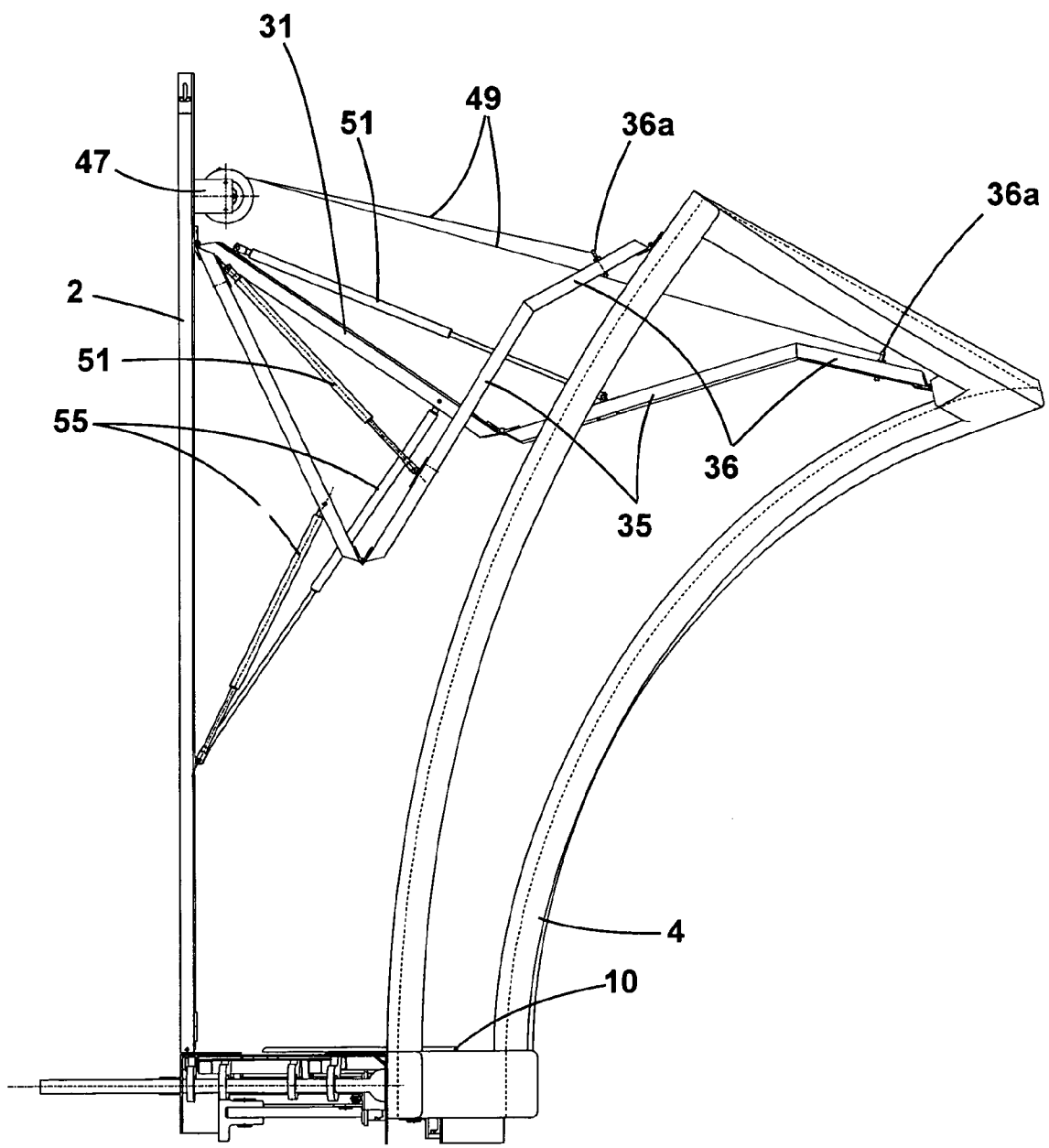
FIG. 4 is a view according to FIG. 2, also without the pleated bellows.

With respect to the following implementations, the reader is referred to the FIGS. 3 and 4. The articulated arm, which is indicated generally at 30, (such an articulated arm is disposed in the region of each leg 5*a* of the bellows 5 in the ceiling region of the bellows) includes the upper arm member 31, which is hinged to the gantry frame 2, and the lower arm member 35, which is also connected to the upper arm member 31 by a hinge connection. Both the lower arm member 31 and the upper arm member 35 are joined together by the first piston and cylinder unit 51, said first piston and cylinder unit being hinged respectively to the upper and to the lower arm member. The piston and cylinder unit 51 can be configured as a gas spring or as a telescopic spring rod. The second piston and cylinder unit has the reference numeral 55, said piston and cylinder unit 55, which may also be configured as a gas spring or as a telescopic rod spring, being hinged to the gantry frame 2 and also to the upper arm member 31. At its end, the lower arm member 35 has the end link labelled 36, which is also hinged at its end to the flexible frame 3.

Figure 6:
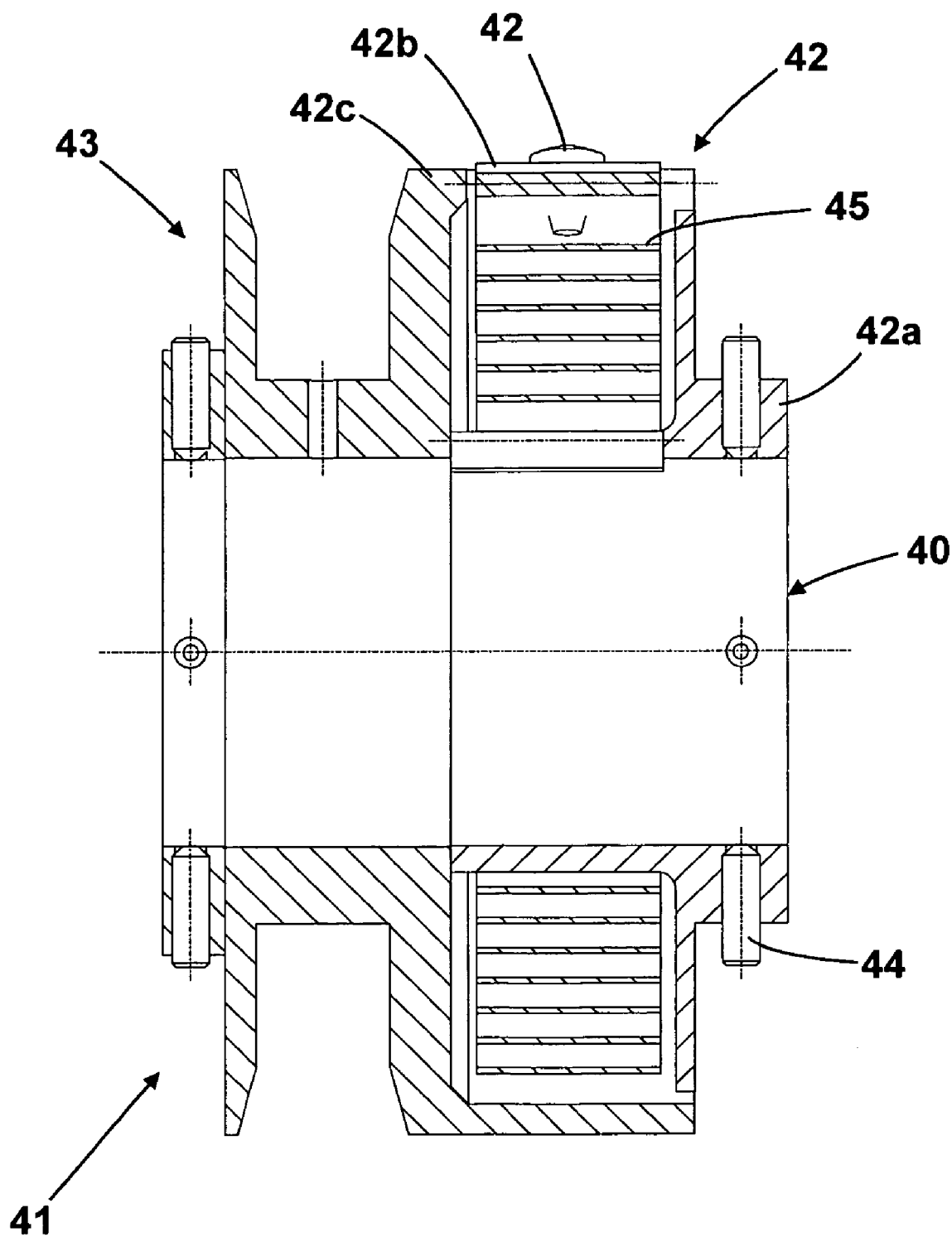
FIG. 6 shows the winding device with spring accumulator and belt pulley.

The two piston and cylinder units 51 and 55 are provided for actuating the articulated arm 30. Said piston and cylinder units 51 and 55, which are e.g., configured to be gas springs, cause the flexible frame 3 to pivot as the bellows 5 is being extended in accordance with FIG. 3. Two winding devices 41, which are associated with each articulated arm, are located on the motor-driven shaft. The configuration of the winding device 41 can be seen from FIG. 6. It shows a spring accumulator 42 and a belt pulley 43 that is directly connected to the spring accumulator. The belt pulley 43, which receives the belt 49 configured to be a traction means (FIG. 3), is not connected to the shaft 40 but is rather rotatable relative thereto. The spring accumulator 42, by contrast, is connected to the shaft 40. The spring accumulator 42 includes an inner housing portion 42*a* and an outer housing portion 42*b*, with the upper housing portion 42*b* being connected to the belt pulley 43 through the screw 42*c*, as already explained. The housing 42, which is formed from the two housing portions 42*a*, 42*b*, receives the bent leaf spring which is formed in a spiral and is indicated generally at 45. The spring ends are connected on the one side to the inner housing portion 42*a* and on the other side to the outer housing portion 42*b*. The lower housing portion 42*a* is firmly seated on the shaft 40. The lower housing portion 42 is connected to shaft 40 by the stud screws 44.

The functioning principle of the spring accumulator is as follows. When the bellows is retracted, the spring 45 is tensioned. Upon rotation of the shaft 40 by motor 47, the belt 49, which is fastened to the hook 36*a* of the end link 36, is unwound from the belt pulley 43. If the flexible frame 3 rests at its bumper 4 against the outer skin of the aircraft in the region of the one articulated arm and if the flexible frame 3 does not fit thereagainst in the region of the other articulated arm, the shaft 40 first continues to rotate. In order to prevent the belt webbing 99 of the winding device 41, which is associated with the one articulated arm the end of which is connected to that portion of the frame that already fits against the aircraft (FIG. 3), from sagging, the spring accumulator continues to rotate and hereby releases the spring 45, thus preventing the belt 49 from sagging. The bias of the spring is chosen so that the spring has sufficient storage capacity to accumulate the number of rotations of the shaft 40 the other articulated arm needs to fit against the outer skin of the aircraft.

Another object of the invention is the gangway bottom plate 10. The gangway bottom plate 10 includes a plurality of floor lamellae 11a and 11e having at their respective ends the edges 12a through 12e (FIG. 5a) through which said floor lamellae 11a through 11e are connected together. Moreover, each floor lamella 11a through 11e has eyes 13 at its end, said eyes 13 serving to receive the guide rod labelled at 14. Beneath the gangway bottom plate 10 there is the stabilizer 15. The stabilizer, which is labelled at 15, includes two arms 15a and 15b, said arms 15a, 15b being fastened by hinge bearing means 16 to the floor lamella 11a, whereas the front floor lamella 11f has a slide guide 17 for receiving a slide 17a for another hinge bearing means 18 which receives, as already discussed, the other end of the respective one of the arms 15a, 15b. The slide 17a is subjected to the force of a piston and cylinder unit 19 that is also hingedly supported by the corresponding floor lamella 11. The piston and cylinder unit 19 can be configured to be a gas spring or a telescopic spring rod. The two piston and cylinder units 19 retain the gangway bottom plate 10 consisting of the various floor lamellae 11 through 11f in the extended position as can be seen from FIG. 5.

Figure 5:
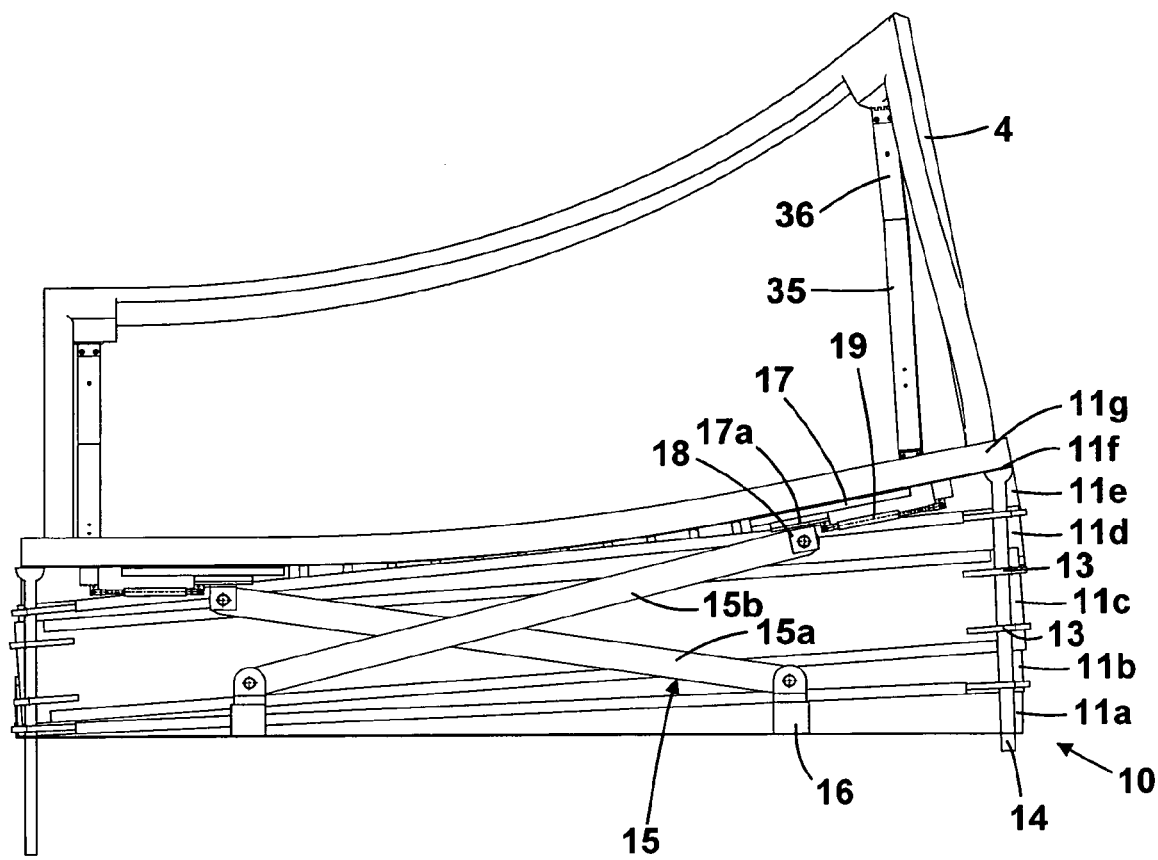
FIG. 5 is a view from the bottom, with the pleated bellows also being removed.
Figure 5A:
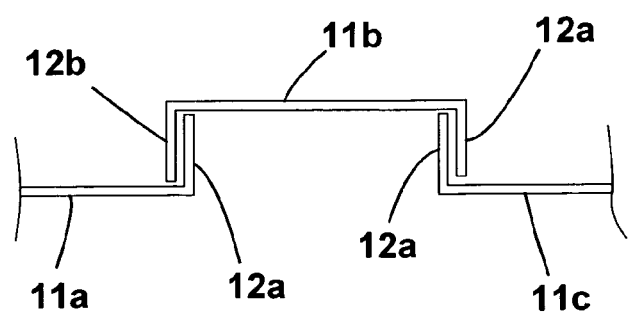
FIG. 5*a* schematically depicts the connection between the various floor lamellae.

The front floor lamella 11f further comprises a front plate 11f to which the bulge 11g is fastened (FIG. 5). The front plate 11f is fastened to the ends of the floor lamella lie only so that, if the material of the front plate 11f is configured and arranged to be accordingly flexible, said front plate is capable of elastically deforming. This is the case if the bulge 11g, which extends beyond the floor lamella in the direction of the opening, comes into contact with the hull of the aircraft, thus allowing the front plate 11f to conform to the hull of the aircraft. The front plate 11f may be arranged on the floor lamella 11e in such a manner that the front edge beneath the front lamella of the front plate is connected such as by welding or gluing to the floor lamella at the ends only so that the front plate 11f is deformable along its length to form a curve.

We claim:

1. A seal for aircraft boarding stairs or for an aircraft boarding bridge, said seal comprising a bellows (5) that spans a gangway bottom plate (10), said bellows comprising a flexible frame (3) at its one open end and having at its other end a gantry frame (2) intended to be fastened to the aircraft boarding stairs or to the aircraft boarding bridge, the flexible frame (3) resting against the outer skin of the aircraft when the bellows is deployed and an actuation device for actuating the bellows being provided for extending and retracting the bellows, said actuation device comprising a rotatable shaft equipped with a drive, said rotatable shaft (40) permitting to wind and unwind a traction means connected to the flexible frame, wherein the actuation device (20) comprises two articulated arms (30) arranged in a spaced-apart relationship, each articulated arm (30) comprising an upper arm member (31) and a lower arm member (35) coupled to said upper arm member by a hinge, said upper arm member (31) of the articulated arm (30) being hinged to the gantry frame (2) in the roof region of the bellows (5) and the lower arm member (35) being hinged to the flexible frame (3), extension means (51, 55) being provided for extending the bellows (5) including a first piston and cylinder unit (51) that serves to extend the lower arm member (35) relative to the upper arm member (31), and the first piston and cylinder unit (51) is hinged at its one end to the upper arm member (31) and at its other end to the lower arm member (35).

2. The seal according to claim 1, wherein the flexible frame (3) is made from a glass fiber reinforced plastic material.

3. The seal according to claim 1, wherein said extension means includes a second piston and cylinder unit (55) that serves to swing out the upper arm member (35).

4. The seal according to claim 3, wherein the second piston and cylinder unit (55) is hinged at its one end to the gantry frame (2) and at its other end to the upper arm member (31).

5. The seal according to claim 1, wherein the lower arm member (35) comprises an end link (36) that is fastened to the lower arm member (35) so as to be inclined at an angle therewith.

6. The seal according to claim 1, wherein the rotatable shaft (40) comprises a winding device (41) for the traction means (49).

7. The seal according to claim 6, wherein the winding device (41) comprises a spring accumulator (42) and a belt pulley (43) connected thereto.

8. The seal according to claim 7, wherein the spring accumulator (42) is coupled to the shaft (40).

9. The seal according to claim 7, wherein the spring (45) of the spring accumulator (42) is tensioned when the bellows (5) is in the retracted state.

10. The seal according to claim 1, wherein the gangway bottom plate (10) comprises a plurality of guided floor lamellae (11a-11e) that are joined together.

11. The seal according to claim 10, wherein the floor lamellae (11a-11e) are slidably receivable by a guide element (14).

12. The seal according to claim 11, wherein the guide element is configured to be a guide rod (14) that connects the gantry frame (2) to the front floor lamella (11e), the floor lamellae (11a-11e) comprising eyes (12) for receiving the guide rod (14).

13. The seal according to claim 11, wherein in the region of their longitudinal edges, the floor lamellae (11a-11e) comprise drivers (12a-12b) for extending the floor lamellae (11a-11e) in an accordion-like manner to form the gangway bottom plate (10) when the bellows (5) is being extended.

14. The seal according to claim 10, wherein a stabilizer (15) is disposed underneath the floor lamellae (11a-11e) in order to prevent the gangway bottom plate (10) from drooping at its ends.

15. The seal according to claim 14, wherein the stabilizer (15) includes two arms (15a, 15b) that are arranged in a crosswise configuration and are respectively hinged to the front floor lamella (11e) on the one side and to the rear floor lamella (11a) or to the gantry frame (2) on the other side.

16. The seal according to claim 10, wherein the front floor lamella (11e) is configured to be elastically deformable along its length so as to be capable of conforming to the contour of the fuselage of the aircraft.

17. The seal according to claim 16, wherein the front floor lamella (11e) comprises an elastically resilient buffer (11g) at its front end.

18. The seal according to claim 14, wherein the stabilizer (15) is adapted to be brought into an extended position by a piston and cylinder unit (19).

19. The seal according to claim 6, wherein the traction means (49) is a belt.

20. A seal for aircraft boarding stairs or for an aircraft boarding bridge, said seal comprising a bellows (5) that spans a gangway bottom plate (10), said bellows comprising a flexible frame (3) at its one open end and having at its other end a gantry frame (2) intended to be fastened to the aircraft boarding stairs or to the aircraft boarding bridge, the flexible frame (3) resting against the outer skin of the aircraft when the bellows is deployed and an actuation device for actuating the bellows being provided for extending and retracting the bellows, said actuation device comprising a rotatable shaft equipped with a drive, said rotatable shaft (40) permitting to wind and unwind a traction means connected to the flexible frame, wherein the actuation device (20) comprises two articulated arms (30) arranged in a spaced-apart relationship, each articulated arm (30) comprising an upper arm member (31) and a lower arm member (35) coupled to said upper arm member by a hinge, said upper arm member (31) of the articulated arm (30) being hinged to the gantry frame (2) in the roof region of the bellows (5) and the lower arm member (35) being hinged to the flexible frame (3), extension means (51, 55) being provided for extending the bellows (5) including a first piston and cylinder unit (51) that serves to extend the lower arm member (35) relative to the upper arm member (31), the one first piston and cylinder unit (51) being hinged at its one end to the upper arm member (31) and at its other end to the lower arm member (35), and said extension means includes a second piston and cylinder unit (55) that serves to swing out the upper arm member (35).

* * * * *